(12) United States Patent
Wakou et al.

(10) Patent No.: US 7,445,270 B2
(45) Date of Patent: Nov. 4, 2008

(54) MOUNTING STRUCTURE OF IMPACT ABSORBING PAD

(75) Inventors: Taku Wakou, Kanagawa (JP); Satoru Nagamoto, Wako (JP)

(73) Assignees: Kasai Kogyo Co., Ltd., Kanagawa-Ken (JP); Honda Giken Kogyo Kabushiki Kaisha, Tokyo (JP)

( * ) Notice: Subject to any disclaimer, the term of this patent is extended or adjusted under 35 U.S.C. 154(b) by 478 days.

(21) Appl. No.: 11/214,387

(22) Filed: Aug. 29, 2005

(65) Prior Publication Data

US 2006/0151981 A1  Jul. 13, 2006

(30) Foreign Application Priority Data

Sep. 1, 2004  (JP) .......................... P2004-254664

(51) Int. Cl.
 *B60R 21/04* (2006.01)
(52) U.S. Cl. ............................. 296/187.05; 296/187.03; 296/146.7
(58) Field of Classification Search ............ 296/187.05, 296/187.12, 146.1, 146.5, 146.7, 152, 153, 296/187.03; 188/371–377
See application file for complete search history.

(56) References Cited

U.S. PATENT DOCUMENTS

| | | | | |
|---|---|---|---|---|
| 4,929,017 A | * | 5/1990 | Lilienthal et al. ........... | 296/153 |
| 5,169,204 A | * | 12/1992 | Kelman .................... | 296/146.7 |
| 5,588,692 A | * | 12/1996 | Gandhi et al. ............. | 296/146.7 |
| 5,707,098 A | * | 1/1998 | Uchida et al. ............. | 296/146.6 |
| 5,836,641 A | * | 11/1998 | Sugamoto et al. ....... | 296/187.05 |
| 6,435,602 B1 | * | 8/2002 | Sukegawa et al. ........... | 296/191 |
| 6,616,216 B2 | * | 9/2003 | Furuyama et al. ........ | 296/146.7 |
| 7,008,003 B1 | * | 3/2006 | Hirose et al. .............. | 296/146.7 |
| 7,178,855 B2 | * | 2/2007 | Catron et al. ............. | 296/146.7 |

FOREIGN PATENT DOCUMENTS

JP     2003-252155     9/2003

\* cited by examiner

*Primary Examiner*—D. Glenn Dayoan
*Assistant Examiner*—Greg Blankenship

(57) ABSTRACT

A mounting structure of an impact absorbing pad mounted to a back surface of an interior lining, which makes it possible to facilitate positioning and mounting of the impact absorbing pad, and which enhances durability of the impact absorbing pad by preventing breakage of the impact absorbing pad when an impact load is applied from a lateral direction of an indoor side of a vehicle.

A box-shaped holder is vertically provided at a mounting reference position of a back surface of a door lining body in a door lining (interior lining), an insertion piece in an impact absorbing pad is fitted in the above described box-shaped holder, and positioning and fixing at a reference fixing point of the impact absorbing pad performed. Then, by giving flexibility along a load direction to a top plate part of the above described box-shaped holder, the above described top plate part is bent when an impact load is applied from the lateral direction of the indoor side of the vehicle, whereby an excessive load applied to the top surface of the insertion piece can be reduced, and durability of the impact absorbing pad is enhanced.

1 Claim, 7 Drawing Sheets

PRIOR ART

PRIOR ART

MOUNTING STRUCTURE OF IMPACT ABSORBING PAD

BACKGROUND OF THE INVENTION

1. Field of the Invention

The present invention relates to a mounting structure of an impact absorbing pad which is mounted to a back surface of an interior lining such as a door lining or the like, and particularly relates to a mounting structure of an impact absorbing pad which makes it possible to facilitate positioning and fixing of the impact absorbing pad by providing a holder integrated with the lining at a mounting reference position of the impact absorbing pad, and is enhanced in durability of the impact absorbing pad without breakage of the impact absorbing pad owing to the holder even if an impact load is applied from a lateral direction of an indoor side of a vehicle at a time of side collision or the like.

2. Description of the Related Arts

The interior lining mounted to the indoor side of the side wall panel of a vehicle normally includes an impact absorbing function capable of absorbing an impact load applied to a passenger when an impact is applied from a side. For example, a door lining 1 shown in FIG. 9A satisfies the function of the door lining 1 by a door lining body 1a being formed into a predetermined shape by mold-press forming, or injection-molding a synthetic resin such as a PP (polypropylene) resin or the like and providing an arm rest 1b, a door pocket 1c and a speaker grill 1d to be integrated with the door lining body 1a or separately from the door lining body 1a.

On the back surface of the door lining body 1a in the door lining 1, an impact absorbing pad 2 is bonded and fixed to a location corresponding to, for example, a waist of a passenger by a hot-melt adhesive or the like, as a waist impact area as shown in FIG. 9B. As the impact absorbing pad 2, polyurethane foam, polystyrene foam and the like which are molded are conventionally used.

Recently, attention is given to a method for mounting the impact absorbing pad 2 by mechanical fixing in order to position the impact absorbing pad 2 at a predetermined location of the back surface of the door lining body 1a quickly and enhance operability. For example, as shown in FIG. 10, as a method for mechanically fixing the impact absorbing pad 2 at three fixing points, a box-shaped holder 3 is vertically provided at a mounting reference position at the back surface of the door lining body 1a, and mounting bosses 4 are projectingly formed at the remaining two fixing points.

Then, an insertion piece 5 of the impact absorbing pad 2 is inserted into an opening 3a of the box-shaped holder 3, and fixation of the impact absorbing pad 2 at the mounting reference position is carried out. Thereafter, the mounting bosses 4 are inserted into mounting holes 6a of mounting pieces 6 symmetrically formed at a left and a right sides of the impact absorbing pad 2, and tip ends 4a of the mounting bosses 4 are ultrasonically crimped, whereby, the impact absorbing pad 2 is fixed at three points that are the box-shaped holder 3 and two ultrasonic fixing points in the predetermined location of the back surface of the door lining body 1a as shown in FIG. 11 to FIG. 13. Accordingly, the insertion piece 5 of the impact absorbing pad 2 has the construction in which a top surface 5a and three side surfaces 5b abut on and are supported by an inside of the box-shaped holder 3, as shown, for example, in Japanese Patent Application Laid-open No. 2003-252155.

The bonding and fixing structure which is conventionally adopted as the structure for mounting the impact absorbing pad 2 to the back surface of the door lining body 1a has the disadvantages that positioning of the impact absorbing pad 2 is troublesome and a long operation time is required for a coating step, a drying step and the like of the adhesive. On the other hand, the mechanical fixing structure which uses the box-shaped holder 3 and the mounting bosses 4 can solve these disadvantages, and has the advantages of facilitating positioning and requiring a short operation time.

However, in the structure using the box-shaped holder 3, the construction in which the box-shaped holder 3 supports the insertion piece 5 so as to wrap the insertion piece 5 is adopted, and therefore, the disadvantages that a fitting operation is complicated because the sectional area of the opening 3a of the box-shaped holder 3 and the sectional area of the insertion piece 5 are set to be substantially the same; and when the knee of a passenger hits the door lining 1 and an impact is applied from the lateral direction of the indoor side of the vehicle, a load especially concentrates on the impact absorbing pad 2 from an edge part 3c of a top plate part 3b of the box-shaped holder 3, the impact absorbing pad 2 is broken and falls off, and the impact absorbing function of the impact absorbing pad 2 cannot be fully performed at the time of collision are pointed out.

SUMMARY OF THE INVENTION

The present invention is made in view of the above circumstances, and an object of the present invention is to provide a mounting structure of an impact absorbing pad mounted to a back surface of a lining body in an interior lining mounted to an indoor side of a side wall panel of a vehicle, which is a mounting structure of an impact absorbing pad that is capable of favorably maintaining impact absorbing performance of an impact absorbing pad for a long time by reducing a load applied to the impact absorbing pad from the box-shaped holder when an impact is applied from a lateral direction of an indoor side of a vehicle, and is capable of enhancing mounting operability of the impact absorbing pad, in a mounting structure of an impact absorbing pad which simplifies a positioning operation and a mounting operation by using the box-shaped holder.

In order to achieve the above-described object, the present invention is, in a mounting structure of an impact absorbing pad for mounting an impact absorbing pad to a back surface of a lining body in an interior lining internally mounted to a side wall panel of a vehicle, characterized in that an insertion piece is integrally formed at the aforesaid impact absorbing pad, a box-shaped holder is formed at a mounting reference position of a back surface of the lining body, and an insertion piece of the impact absorbing pad is fitted into the box-shaped holder, whereby the impact absorbing pad is positioned at a predetermined position, and is fixed at a reference fixing points; and a top plate part of the box-shaped holder is given flexibility along a load direction on an occasion of a load in a lateral direction being applied, whereby the top plate part in the box-shaped holder is bent in the load direction, and the load applied to the impact absorbing pad from the edge part of the top plate part is reduced.

Here, as the interior lining, the present invention can be applied to all the linings mounted to the indoor surface side of the side wall panel of the vehicle, such as a door lining, a rear side lining and the like. In the interior lining, functional components such as an arm rest, a switch finisher, a speaker grill and the like are integrally or separately provided on a front surface side of the lining body formed into a predetermined shape.

Further, the impact absorbing pads are provided at the places which a waist portion and a shoulder portion of a passenger easily touch when an impact is applied from the lateral direction of the indoor side of the vehicle at a time of side collision or the like, namely, on the back surface of the lining body in a waist impact area, a shoulder impact area and the like. As the impact absorbing pad, polyurethane foam, polystyrene foam and the like molded into predetermined shapes are generally used.

As the mounting structure of the above described impact absorbing pad, the box-shaped holder is integrally formed at the back surface of the lining body at the first fixing point in the impact absorbing pad, namely, the reference fixing point, and by inserting and fixing the insertion piece of the impact absorbing pad into the box-shaped holder, positioning of the impact absorbing pad and fixing the impact absorbing pad at the reference fixing points are performed. Then, for the remaining fixing points, for example, the mounting bosses formed to project from the back surface of the lining body are inserted into the mounting holes of the impact absorbing pad, and the tip ends are crimped and fixed by ultrasonic welding, or are mechanically fixed by a fixture such as a push nut or the like, or the remaining fixing points can be fixed by bonding by using a hot-melt adhesive.

The characteristic of the present invention lies in that in the box-shaped holder which is provided at the reference fixing point, and in which the insertion piece of the impact absorbing pad is inserted and fitted, the top plate part is given flexibility in a load direction on an occasion of a lateral load being applied. As the mode of giving the flexibility, the aforesaid box-shaped holder is characterized in that among four sides of a perimeter of the square-shaped top plate part, adjacent two sides are supported by a side wall, remaining two sides are free ends, and openings are set on adjacent two side surfaces, whereby flexibility along the load direction on an occasion of a lateral load being applied is given to the top plate part.

In another mode of giving the flexibility to the top plate part of the box-shaped holder, the aforesaid box-shaped holder is characterized in that three sides of the square-shaped top plate part are supported by the side wall, one of side surfaces is set as an opening, and a slit is provided at the top plate part, whereby flexibility along the load direction on the occasion of the lateral load being applied is given to the top plate part.

Accordingly, in the present invention in application, by fitting the insertion piece of the impact absorbing pad into the box-shaped holder provided to project at the back surface of the lining body, the impact absorbing pad is positioned at a predetermined position and can be fixed at the reference fixing point. Since the method is for fixing the remaining fixing points thereafter, positioning of the impact absorbing pad is facilitated. Since flexibility along the impact load direction is especially given to the top plate part of the box-shaped holder, when the load in the lateral direction is applied, the top plate part flexibly deforms in the load direction by the compression deformation of the impact absorbing pad, even if the repulsive force is applied to the top plate part of the box-shaped holder, and therefore an excessive load is not applied to the impact absorbing pad from the top plate part. Therefore, breakage of the impact absorbing pad can be prevented.

Further, since the flexibility is given to the top plate part in the box-shaped holder, the opposite side of the insertion piece in the impact absorbing pad can be lifted up by bending the top plate part, and positioning with respect to the other fixing points can be facilitated. By adopting the construction in which the openings are provided on the adjacent two side surfaces, the operation of inserting the impact absorbing pad into the box-shaped holder can be performed from two directions, and the positioning operation of the impact absorbing pad can be performed more smoothly.

As described above, the mounting structure of the impact absorbing pad according to the present invention adopts the mounting structure in which the box-shaped holder is set at the reference fixing point provided at the lining body, and the insertion piece provided at the impact absorbing pad is inserted into the above described box-shaped holder to position and fix the reference point, and has the construction in which the top plate part of the box-shaped holder is given the flexibility along the load direction on the occasion of the load in the lateral direction being applied. Therefore, the mounting structure of the impact absorbing pad according to the present invention has the effects that the positioning operation and the mounting operation of the impact absorbing pad can be performed smoothly, when the a load is applied from the lateral direction of the indoor side of the vehicle, excessive stress is not applied to the impact absorbing pad from the top plate part of the box-shaped holder, breakage of the impact absorbing pad can be prevented, and durability of the impact absorbing pad can be enhanced.

DETAILED DESCRIPTION OF THE PREFERRED EMBODIMENTS

Hereinafter, embodiments of a mounting structure of an impact absorbing pad according to the present invention will be described in detail with reference to the attached drawings.

Embodiment 1

Figure 1:
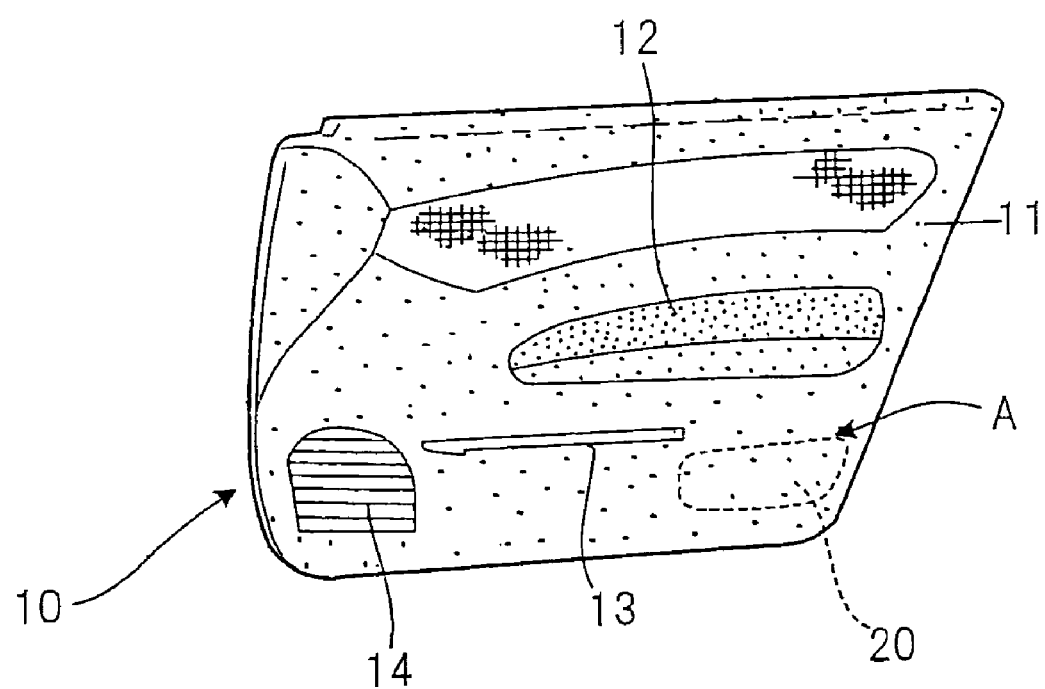
FIG. 1 is a front view showing a door lining in which an impact absorbing pad according to the present invention is set at a waist impact area with which a waist portion of a passenger interferes.
Figure 2:
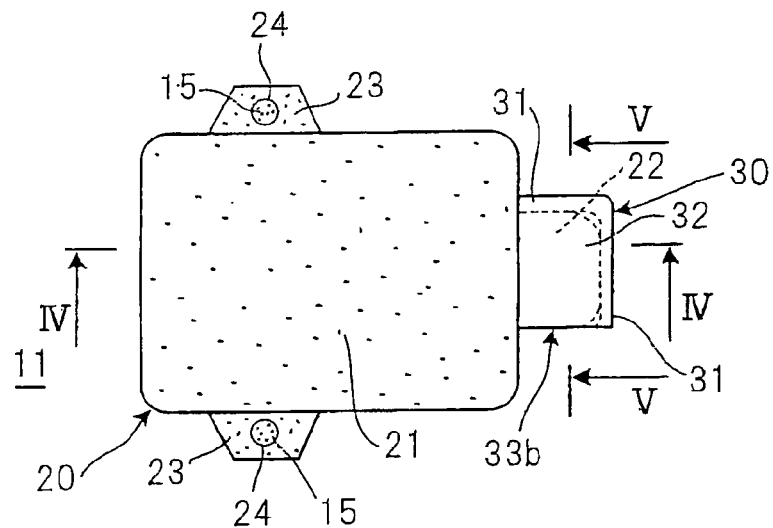
FIG. 2 is a plane view of an impact absorbing pad seen from a panel side, which shows a first embodiment of a mounting structure of an impact absorbing pad according to the present invention.
Figure 3:
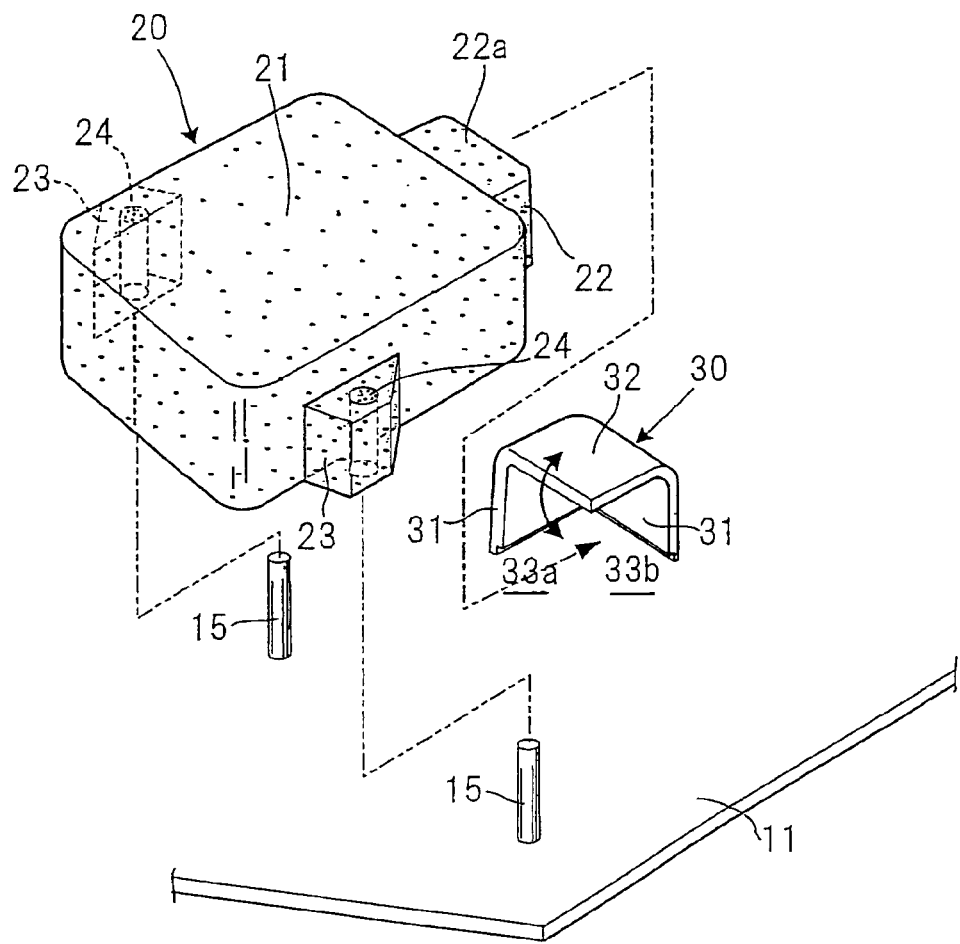
FIG. 3 is an explanatory view showing the mounting structure of the impact absorbing pad shown in FIG. 2.
Figure 4:
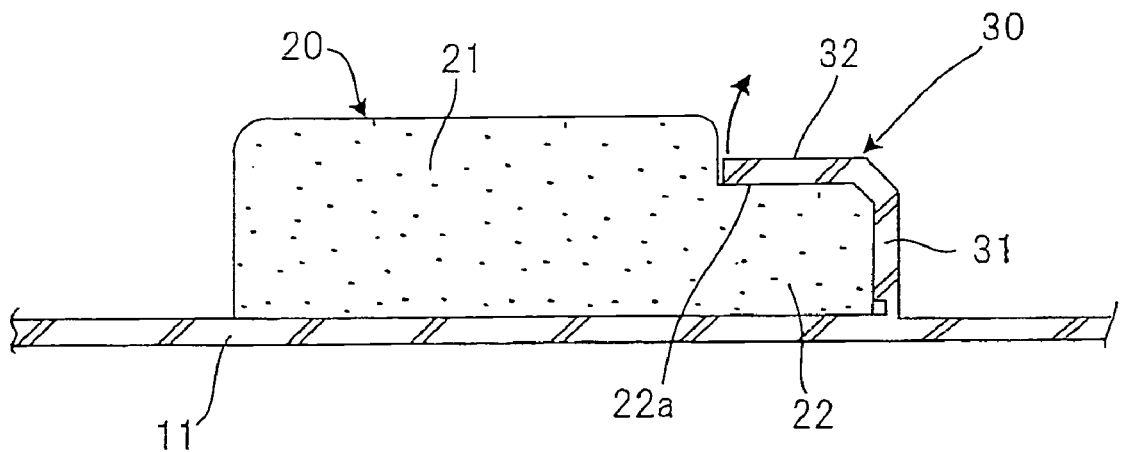
FIG. 4 is a sectional view taken along the line IV to IV in FIG. 2.
Figure 5:
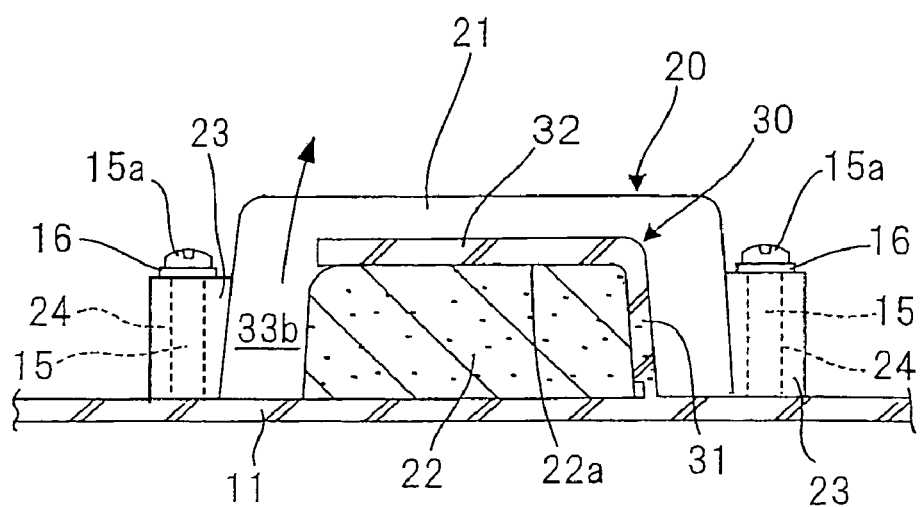
FIG. 5 is a sectional view taken along the line V to V in FIG. 2.

FIGS. 1 to 5 are application of a mounting structure of an impact absorbing pad according to the present invention to a door lining, FIG. 1 is a front view showing a door lining, FIG. 2 is a plane view showing a mounting state of the impact absorbing pad to a back surface of the door lining seen from a panel side, FIG. 3 is an explanatory view showing a mounting structure of the impact absorbing pad mounted to a back surface of a lining body in the door lining shown in FIG. 1, and FIGS. 4 and 5 are sectional views each showing the mounting structure of the impact absorbing pad.

In FIG. 1, a door lining 10 has a door lining body 11 formed into a predetermined shape as a base, and the door lining body 11 is formed into the predetermined shape by injection-molding or mold-press forming a PP (polypropylene) resin, or a PP resin with talc mixed therein. Note that other than a PP resin, a general purpose synthetic resin such as a PE resin, an ABS resin and the like can be used.

Besides, an arm rest 12 bulged to the indoor side in a center of the product surface side of the door lining body 11, a door pocket 13 capable of housing fixtures, below the arm rest 12, and a speaker grill 14 at a front side of the door pocket 13 are provided integrally with or separately from the door lining body 11.

A region shown by the dotted line in FIG. 1 is a mounting location of an impact absorbing pad 20 mounted to the back surface of the door lining body 11, and the impact absorbing pad 20 placing location corresponds to a waist impact area A with which a waist portion of a passenger interferes when a load is applied from the lateral direction of the indoor side of the vehicle. As the above described impact absorbing pad 20, mold-formed polyurethane foam, olefin resin foam, olefin resin foam bead molded body or the like can be used, but in consideration of cost and impact absorbing performance, a molded body of a urethane resin, namely, mold urethane is preferable. In this embodiment, mold urethane is used, and mold urethane, which shows the physical property values of foam density of urethane of 0.02 to 0.23 g/cm$^3$, and a repulsive force at the time of compression of 50% of 3 to 5 kgf, is used.

Incidentally, the present invention is characterized by the mounting structure of the impact absorbing pad 20, and is characterized by making it possible to easily and smoothly perform a positioning and amounting operations, being capable of preventing breakage of the impact absorbing pad 20 when a load is applied from the lateral direction of the indoor side of the vehicle and enhancing durability of the impact absorbing pad 20. Namely, FIG. 2 is a plane view of a mode of mounting the impact absorbing pad 20 to the back surface of the door lining body 11 seen from the panel side, and FIG. 3 is an explanatory view of the mounting structure of the impact absorbing pad 20. In the mounting area (waist impact area A) of the impact absorbing pad 20, a box-shaped holder 30 is integrally formed at a mounting reference position of a back surface of the door lining body 11, and mounting bosses 15 are vertically formed at two spots of the remaining two fixing points.

More specifically, the box-shaped holder 30 used in the first embodiment has side walls 31 formed in an L shape on adjacent two planes vertically from the surface of the door lining body 11, and has a top plate part 32 connecting to the side walls 31 on the two planes is integrated. Namely, the top plate part 32 is in a substantially square shape, the adjacent two sides are connected to and supported at the side walls 31, the remaining adjacent two sides are in a free state, openings 33a and 33b are provided to open in two directions of the side surfaces, and the top plate part 32 is given flexibility along the direction of the arrow in FIG. 3.

Meanwhile, in the impact absorbing pad 20, an insertion piece 22 smaller in thickness than a pad body 21 is formed to project outward on one side surface of the pad body 21 in a substantially cubic shape, and mounting pieces 23 are formed to project outward on both side surfaces of the pad body 21, and mounting holes 24 penetrating through the mounting pieces 23 are provided.

Accordingly, as the operation of mounting the impact absorbing pad 20 to the predetermined location of the back surface of the door lining body 11, the insertion piece 22 of the impact absorbing pad 20 is inserted into the box-shaped holder 30 formed to project on the back surface of the door lining body 11 through the opening 33 (33a, 33b) to position the impact absorbing pad 20 at a predetermined position as shown by the arrow in FIG. 3, and the impact absorbing pad 20 is fixed at the reference fixing points.

Then, the mounting bosses 15 provided to project from the back surface of the door lining body 11 are inserted into the mounting holes 24 of the mounting pieces 23 at the left and right sides of the pad body 21 in the impact absorbing pad 20, and tip ends 15a of the mounting bosses 15 are ultrasonically crimped via collars (designated by reference numeral 16 in FIG. 5) if desired, whereby the impact absorbing pad 20 can be fixed at the second fixing point and the third fixing point by ultrasonic welding crimping, and the impact absorbing pad 20 can be reliably fixed to the predetermined position of the back surface of the door lining body 11 at the three fixing points.

As described above, in the first embodiment of the present invention, by using the box-shaped holder 30 as a guide for mounting, as the mounting method of the impact absorbing pad 20, positioning for the mounting method of the impact absorbing pad 20 can be easily performed, and after the insertion piece 22 of the impact absorbing pad 20 is inserted into the box-shaped holder 30, the mounting bosses 15 are inserted into the mounting holes 24 of the impact absorbing pad 20, and the tip ends are ultrasonically crimped, whereby a positioning and a fixing operations can be easily performed in a short time. Therefore, as compared with the conventional mounting method using the hot-melt adhesive, the positioning operation and the fixing operation can be easily performed in a short time.

Since the openings 33a and 33b are provided on the adjacent side surfaces, as the shape of the box-shaped holder 30, the operation of inserting the insertion piece 22 of the impact absorbing pad 20 into the box-shaped holder 30 is enabled from two directions, and the positioning operation is facilitated. Further, since flexibility is added to the top plate part 32, the opposite side from the insertion piece 22 in the impact absorbing pad 20 can be lifted when the mounting bosses 15 are inserted into the mounting hole 24 of the impact absorbing pad 20, and thus, the advantage that the inserting operation of the mounting bosses 15 can be smoothly performed is provided.

Further, FIGS. 4 and 5 show the state in which the insertion piece 22 in the impact absorbing pad 20 is supported by the box-shaped holder 30 of the door lining body 11. In the first embodiment, the openings 33a and 33b are provided in the two directions as the box-shaped holder 30, and therefore, when an impact load is applied to the door lining 10 from the lateral direction of the indoor side of the vehicle, for example, at the time of side collision or the like, the repulsive force between the insertion piece 22 of the impact absorbing pad 20 and the box-shaped holder 30 does not cause an excessive load to be applied to the impact absorbing pad 20 from the top plate part 32, because the top plate part 32 of the box-shaped holder 30 is easily deformed flexibly in the arrow directions in FIGS. 4 and 5. Therefore, the effects of making it possible to prevent breakage of the impact absorbing pad 20 and making it possible to enhance durability of the impact absorbing pad 20 are provided.

Further, as a modification example of the first embodiment, the box-shape holder 30 in this shape is used, and as the other fixing points, the fixtures such as push nuts maybe used instead of the mounting bosses 15 and mechanically fixed. After the insertion piece 22 is supported and fixed at the box-shaped holder 30, it is possible to adopt a fixing by bonding structure using a hot-melt adhesive for the other fixing points.

Embodiment 2

Figure 6:
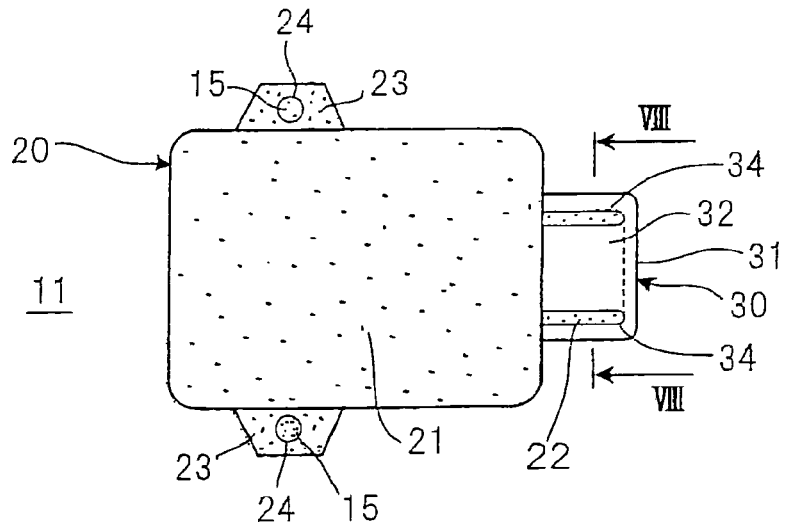
FIG. 6 is a plane view of an impact absorbing pad seen from the panel side, which shows a second embodiment of the mounting structure of the impact absorbing pad according to the present invention.
Figure 7:
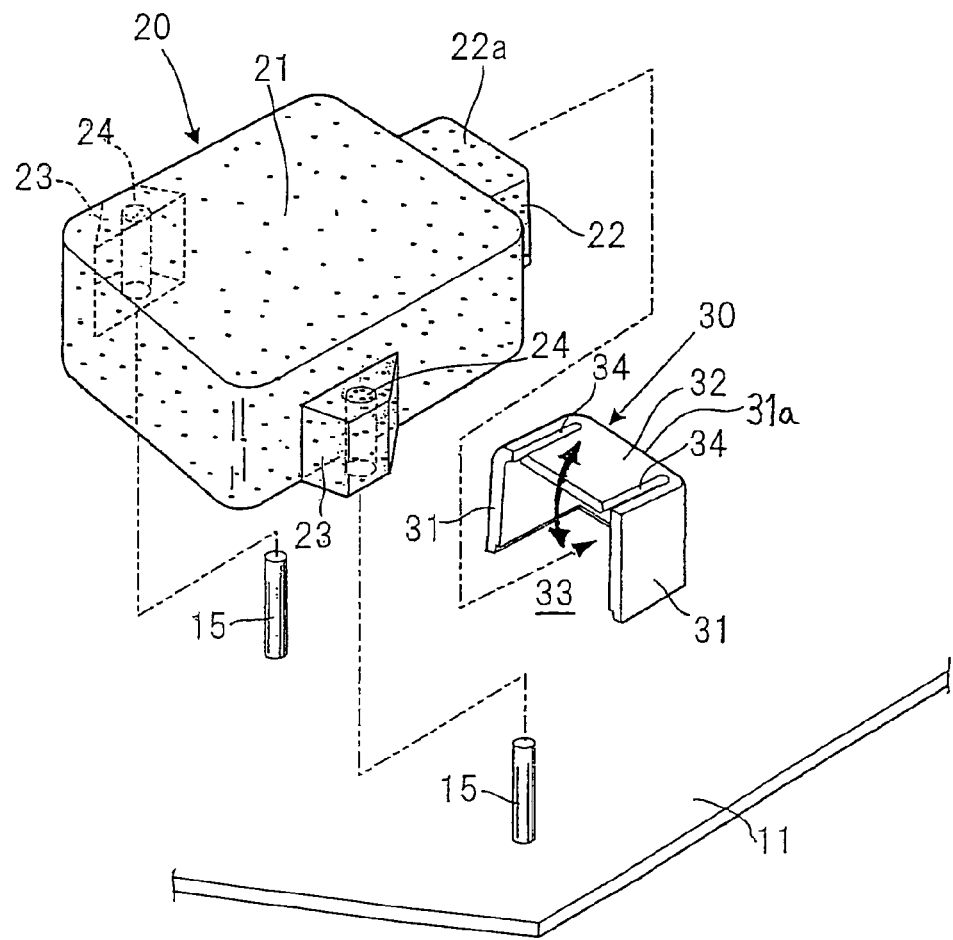
FIG. 7 is an explanatory view showing the mounting structure of the impact absorbing pad shown in FIG. 6.
Figure 8:
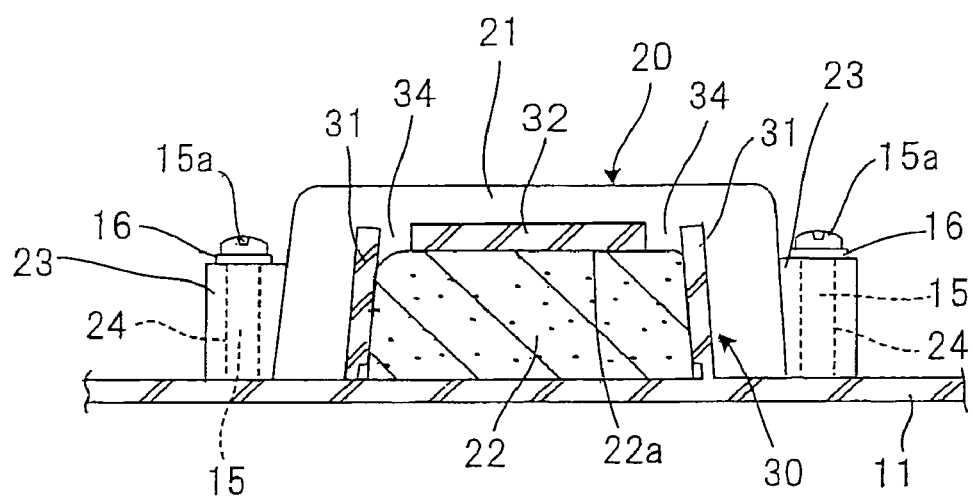
FIG. 8 is a sectional view taken along the line VIII to VIII in FIG. 6.
Figure 9:
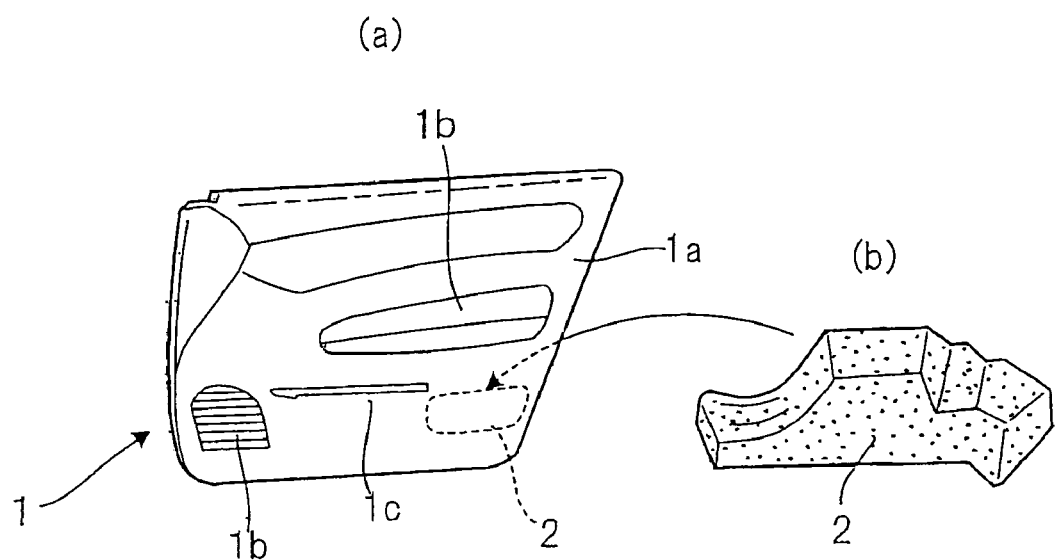
FIG. 9A is a front view showing a door lining for an automobile of a prior art.
FIG. 9B is a perspective view showing an impact absorbing pad mounted to an automobile door lining of the prior art.
Figure 10:
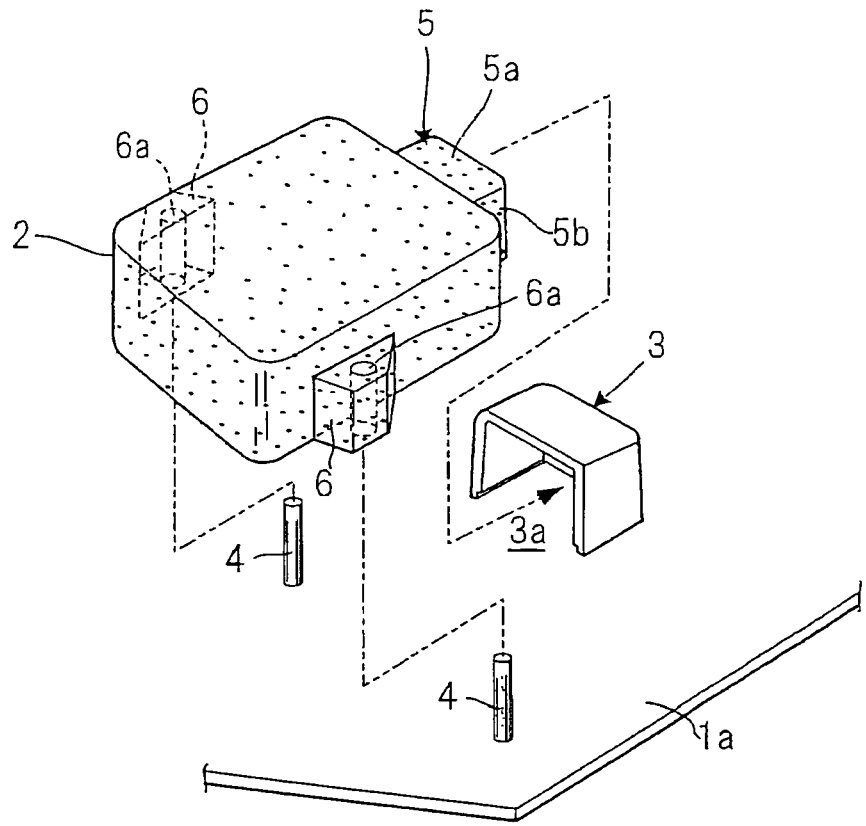
FIG. 10 is an explanatory view showing a mounting structure of an impact absorbing pad of the prior art.
Figure 11:
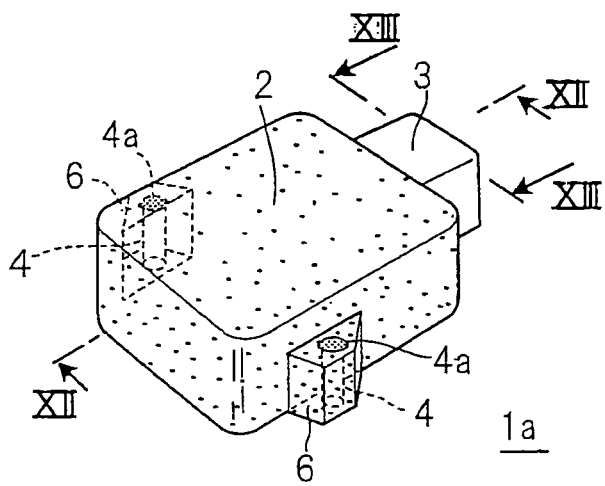
FIG. 11 is a perspective view of the impact absorbing pad mounted to the lining body by the box-shaped holder and bosses of the prior art seen from the back surface side.
Figure 12:
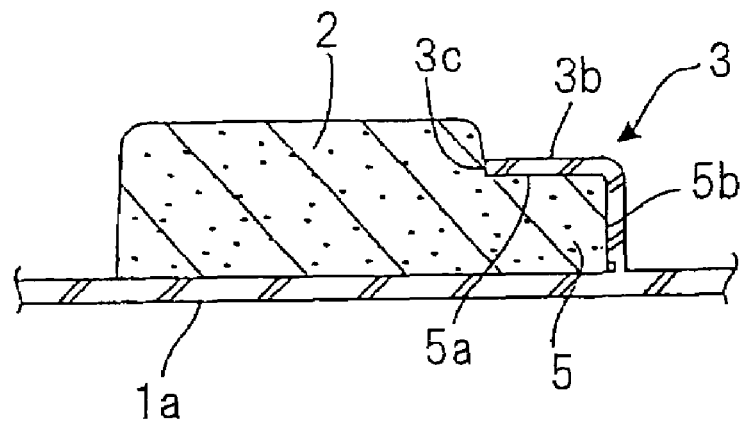
FIG. 12 is a sectional view taken along the XII to XII line in FIG. 11.
Figure 13:
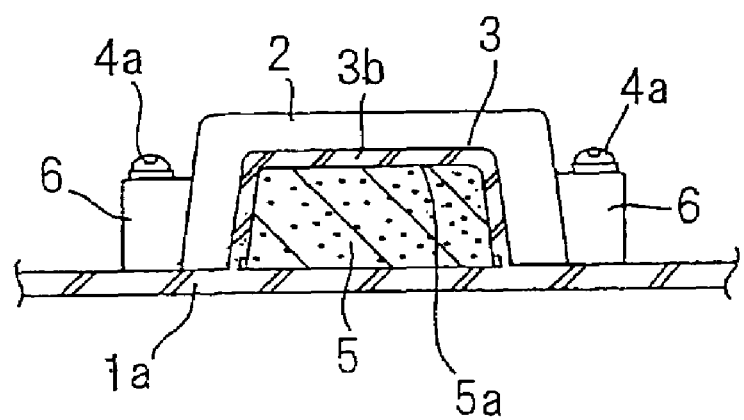
FIG. 13 is a sectional view taken along the XIII to XIII in FIG. 11.

FIGS. 6 to 8 show the second embodiment of the present invention, and the second embodiment is also applied to the mounting structure for mounting the impact absorbing pad 20 to the back surface of the door lining body 11. Accordingly, the same parts as those in the first embodiment are assigned with the same reference numerals and characters, and the detailed explanation of them will be omitted.

In the second embodiment, as shown in FIG. 7, the box-shaped holder 30 provided to project at the back surface of the door lining body 11 includes an opening 33 on one of the side surfaces, and side walls 31 are formed on the remaining three planes. Slits 34 are formed at both sides of the top plate part 32, and the top plate part 32 is supported at one side by the side wall 31a at the rear surface side in the box-shaped holder 30. Flexibility is given to the top plate part 32 at the free end side along the arrow direction in FIG. 7.

Accordingly, in the second embodiment, as the mounting operation of the impact absorbing pad 20, the insertion piece 22 in the impact absorbing pad 20 is fitted into an inside from the opening 33 of the box-shaped holder 30 provided to project at the back surface of the door lining body 11, and the insertion piece 22 is fitted into the box-shaped holder 30 at the mounting reference position, whereby positioning of the impact absorbing pad 20 is performed, and fixing at the first fixing point is performed. Thereafter, the mounting bosses 15 are inserted into the mounting holes 24 provided at both sides of the pad body 21 in the impact absorbing pad 20 as in the first embodiment, and the tip ends 15a are ultrasonically crimped, whereby the impact absorbing pad 20 can be easily positioned at the predetermined position of the back surface of the door lining body 11, and the mounting operation can be completed in a short time.

In the operation of inserting the mounting bosses 15 into the mounting holes 24 of the impact absorbing pad 20, the top plate part 32 in the box-shaped holder 30 is bent upward, and thereby, the mounting piece 23 side of the impact absorbing pad 20 can be lifted upward. Thereby, the insertion operation of the mounting bosses 15 can be easily completed, and the mounting operability of the impact absorbing pad 20 can be enhanced.

Further, the state in which the impact absorbing pad 20 is mounted to the back surface of the door lining body 11 is shown in FIG. 8. When the impact load is applied from the lateral direction of the indoor side of the vehicle, for example, at the time of side collision or the like, an excessive external force is applied to the top surface 22a of the insertion piece 22 from the top plate part 32 in the conventional box-shaped holder, which becomes a main cause of breakage. However, since in the second embodiment, the slits 34 are formed at the both sides of the top plate part 32, the top plate part 32 in the box-shaped holder 30 flexibly deforms in the load direction when a load is applied from the lateral direction of the indoor side of the vehicle, and thereby, the same operational effect as in the first embodiment that the excessive stress is not applied to the insertion piece 22 in the impact absorbing pad 20 and durability in the impact absorbing pad 20 can be enhanced can be expected.

In the second embodiment, the width dimension and the set position of the slit 34 can be properly changed. Besides, as for the modification example of the second embodiment, for example, the construction in which the slits 34 are formed at the top plate part 32 in which the openings 33a and 33b are provided on the adjacent two side surfaces in the first embodiment can be adopted.

The first embodiment and the second embodiment are applied to the mounting structure in which the impact absorbing pad 20 is mounted to the waist impact area A with which the waist portion of a passenger especially interferes in the door lining 10 mounted to the indoor surface side of the door panel, but they can be applied to a mounting structure in which the impact absorbing pad 20 is mounted to a shoulder portion back surface with which the shoulder portion of a passenger interferes in the door lining 10. Besides, they can be also applied to a mounting structure in which the impact absorbing pad 20 is mounted to the lining body in a rear side lining other than the door lining 10.

Further, the box-shaped holders 30 in the first embodiment and the second embodiment are each formed into a cubic shape, and the top plate parts 32 are each set to be a square shape, but the shapes of the box-shaped holder 30 and the top plate part 32 can be properly changed.

What is claimed is:

1. A mounting structure of an impact absorbing pad for mounting an impact absorbing pad to a back surface of a lining body in an interior lining internally mounted to a side wall panel of a vehicle, wherein an insertion piece is integrally formed at the impact absorbing pad, a box-shaped holder is formed at a mounting reference position of a back surface of the lining body, and an insertion piece of the impact absorbing pad is fitted into the box-shaped holder, whereby the impact absorbing pad is positioned at a predetermined position, and fixed at reference fixing points; and a top plate part of the box-shaped holder is given flexibility along a load direction on an occasion of a load in a lateral direction being applied, whereby the top plate part in the box-shaped holder is bent in the load direction, and the load applied to the impact absorbing pad from an edge part of the top plate part is reduced, wherein the edge part of the top plate part is a single side of a perimeter of the square shaped top plate part and is adjacent to the impact absorbing pad, and further wherein in the box-shaped holder, among four sides of the perimeter of the square-shaped top plate part, adjacent two sides are supported by a side wall, remaining two sides are free ends, and openings are set on adjacent two side surfaces, whereby flexibility along the load direction on an occasion of the lateral load being applied is given to the top plate part.

* * * * *